United States Patent [19]

Bleiweiss et al.

[11] 4,118,764

[45] Oct. 3, 1978

[54] LAMP ASSEMBLY

[75] Inventors: Arthur F. Bleiweiss, Toronto; Kenneth J. Crompton, Willowdale; Karel Urbanek, Weston, all of Canada

[73] Assignee: Dominion Auto Accessories Limited, Toronto, Canada

[21] Appl. No.: 750,605

[22] Filed: Dec. 15, 1976

[51] Int. Cl.[2] ........................ B60Q 1/32; F21V 17/00; F21V 15/04

[52] U.S. Cl. .................................... 362/369; 362/390; 362/249; 362/61; 362/457

[58] Field of Search ............... 240/8.2, 153; 339/93 L, 339/14 T, 97 L, 99 L, 90; 362/80, 81, 82, 83, 226, 227, 249, 368, 369

[56] References Cited

U.S. PATENT DOCUMENTS

| | | | |
|---|---|---|---|
| 3,118,616 | 1/1964 | Magazanik | 339/93 L |
| 3,210,532 | 10/1965 | Woofter et al. | 240/41.55 |
| 3,222,512 | 12/1965 | Dickson | 339/93 L |

*Primary Examiner*—J D Miller
*Assistant Examiner*—Peter S. Wong
*Attorney, Agent, or Firm*—Barnes, Kisselle, Raisch & Choate

[57] ABSTRACT

An assembly comprising a lens, a housing assembly including a bottom wall and a resilient mounting member fixed on the bottom wall. The resilient mounting member has a central portion spaced from said bottom wall and having a centrally located opening therein. A socket base is provided which has a centrally located projection that extends through the opening in the resilient mounting member. A grounding strap is fastened to the projection of the socket base and extends beneath the resilient mounting member.

21 Claims, 7 Drawing Figures

LAMP ASSEMBLY

This invention relates to lamp assemblies.

BACKGROUND AND SUMMARY OF THE INVENTION

In lamp assemblies which are used with automotive vehicles, it has become necessary to mount the bulb resiliently in order to minimize the damage to the bulb due to vibration. A typical construction is shown in the U.S. Pat. No. 3,222,512.

In the copending U.S. application, Ser. No. 688,849, filed Mar. 22, 1976, now U.S. Pat. No. 4,070,566, there is disclosed an improved marker lamp construction wherein the lamp socket base includes a projection that extends into an opening in a resilient mounting member.

Among the objectives of the present invention is to provide a simple low-cost means of providing an electrical ground, which obviates the necessity of one electrical lead and the associated connections such as soldering, which does not interfere with accurate bulb positioning, and which does not affect the shock absorbing properties of the shock mounting of the bulb.

In accordance with the invention, a ground strap is fastened to the projection on the socket base and extends beneath the resilient mounting member. In one form the strap forms a ground connection to a metal lamp housing. In another form, the strap extends to an opening in a plastic lamp housing so that an electrical ground can be provided by a screw extending through the strap and the opening in the lamp housing to a metal part of the vehicle on which the lamp is mounted.

DESCRIPTION

Figure 1:
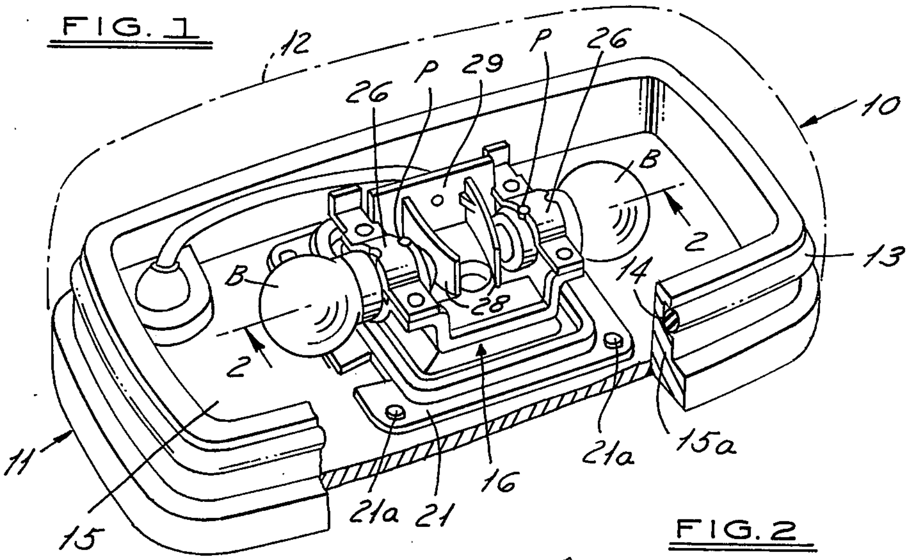
FIG. 1 is a part sectional perspective view of a marker lamp assembly embodying the invention.
Figure 2:
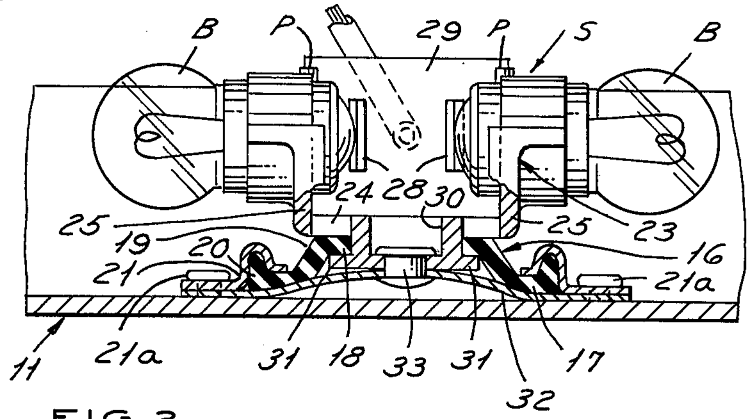
FIG. 2 is a fragmentary sectional view on an enlarged scale taken along the line 2—2 in FIG. 1.
Figure 3:
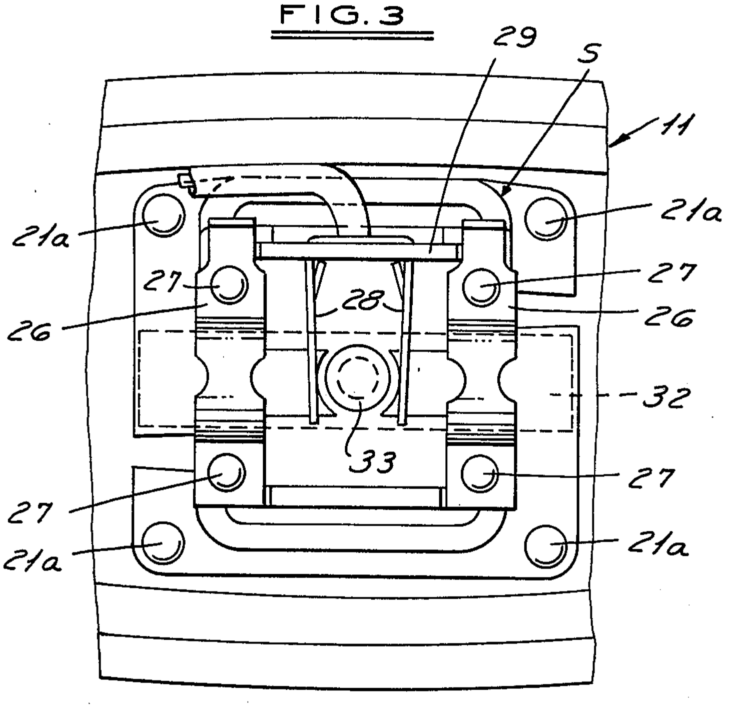
FIG. 3 is a fragmentary plan view of a portion shown in FIG. 1.

Referring to FIGS. 1-3, the marker lamp assembly 10 embodying the invention comprises a housing 11 and a removable lens 12 retained in position by an O-ring 13 that engages a groove 14 in the housing and the complementary groove in the lens.

The housing 11 includes a bottom wall 15 and a peripheral wall 15*a*. The bottom wall 15 has a substantially flat upper surface. A resilient mounting member 16 of resilient material such as polyvinylchloride having a durometer of 55-65 is mounted on the upper surface of the bottom wall 15. The resilient mounting member 16 includes a peripheral flange 17 that engages the upper surface of the wall 15 and a central substantially planar portion 18 of substantially uniform thickness connected to the flange portion 17 by an inclined portion 19. The flange 17 is formed with a raised bead 20 and a complementary retaining plate or frame 21 engages the flange 17. The resilient mounting member 16 and frame 21 are connected to one another by tabs on frame 21 and bent under the flange 17 to form a sub-assembly S. Projections 21*a* on wall 15 extend through openings on frame 21 and the ends of projections are deformed to retain the sub-assembly on base wall 15.

The central portion 18 of the resilient mounting member 16 has an opening that is key-shaped with the center of the circular portion of the opening at the center of the central portion 18.

An electrically conductive socket base 23 is made of a die cast zinc based material and includes a bottom wall 24 and end walls 25 having semi-circular socket receiving portions. The socket for the bulb is completed by clamps 26 that are fastened to the socket base 23 by deforming the ends of projections 27 that extend through openings in the clamps 26. Electrical contact to the ends of the bulbs B is made through contact members 28 mounted on a fiber board 29 that extends into grooves in the socket base.

The surface of bottom wall 24 of the socket base 23 is planar and an integral projection 30 extends downwardly therefrom and has oppositely directed ears 31. The distance between the upper surface of ears 31 and the undersurface of socket base 23 is substantially equal to the thickness of portion 18 of resilient mounting member 16.

The socket base 23 is positioned on the resilient mounting member 16 by inserting the projection 30 through the key-shaped opening in portion 18 and thereafter rotating the base 23 to bring the recesses in the ends of the ears 31 into engagement with the ends of the ribs formed on the undersurface of the resilient mounting member 16. In this manner, the socket base 23 is maintained against rotation with respect to the resilient mounting member 16.

The bulbs are inserted through the opening formed by the clamps 26 and recesses in the walls 25 of base 23 and rotated to bring the pins P into engagement with recesses in clamps 26.

The above described construction is substantially like that shown in the aforementioned U.S. application Ser. No. 668,849.

In accordance with the invention, a ground strap 32 made of a flat rectangular strip of conductive material is fastened to the end of projection 30 by a rivet 33. The strap 32 may be made, for example, from brass. A satisfactory strap comprises yellow brass known as 70-30 cartridge brass or ASTMB36 alloy CA260. The strap 32 is mounted on projection 30 after the projection 30 is passed through the opening in resilient mounting member 16 and after the frame 21 is mounted on member 16. Since the plane of the frame 21 is below the wall 18 of member 16, the strap is stressed so that it bows upwardly with its ends extending downwardly below the frame 21 before the subassembly S is mounted on bottom wall 15. When the assembly is mounted on bottom wall 15 the ends of strap 32 are clamped between the frame 21 and the bottom wall 15 providing an electrical ground from the socket base 23 to the bottom wall 15 of housing 11. When the housing 11 is mounted on a metal part of the vehicle, a circuit is completed.

When the housing of the marker lamp is made of electrically non-conductive material such as plastic rather than metal, alternative constructions are provided as shown in FIGS. 4-7.

Figure 4:
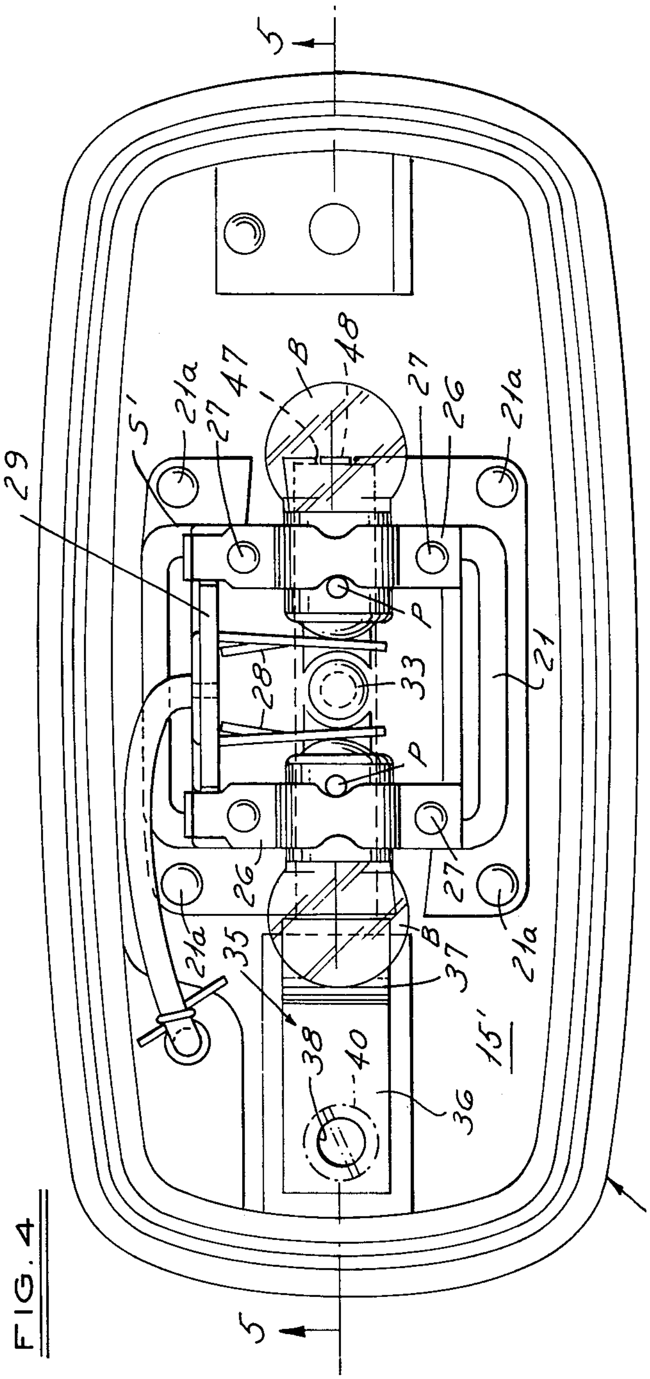
FIG. 4 is a plan view of a modified form of marker lamp assembly.
Figure 5:
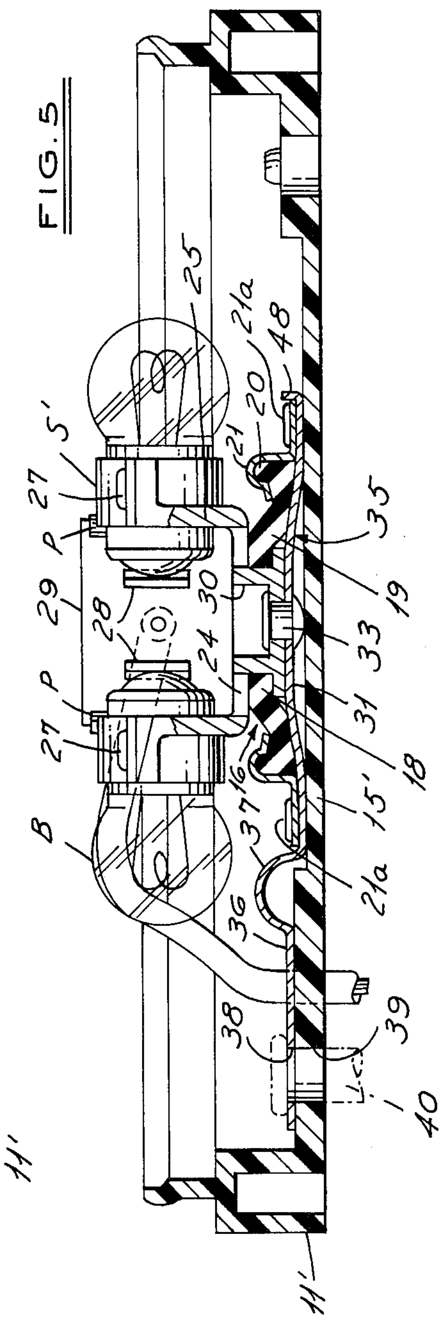
FIG. 5 is a sectional view taken along the line 5—5 in FIG. 4.

Referring to FIGS. 4 and 5, where the housing is made of plastic, a modified form of strap 35 is provided which has one end 36 extending toward one end of housing 11'. The end 36 is flat and connected by an arcuate portion 37. When strap 35 is attached to the socket base 23, the free end 36 extends downwardly beyond frame 21. When the sub-assembly S' is mounted on bottom wall 15' of housing 11', the end portion 36 is bent at the junction of arcuate portion 37 and the remainder of strap 35 so that it lies flat against the upper surface of bottom wall 15'. In this position, an opening 38 in end 36 overlies an opening 39 in the bottom wall 15' so that insertion of a headed screw 40 will provide an electrical group between strap 35 and a metal portion of a vehicle on which the marker lamp is mounted.

In order to accurately locate ground strap 35, an ear 48 is provided in ground strap 35 and fits snugly into a notch 47 cut out of the frame 21. When the rivet 33 is in place, this accurately locates the ground strap 35 relative to the frame 21 and properly aligns the holes in the ground strap 35 and housing 11.

Figure 6:
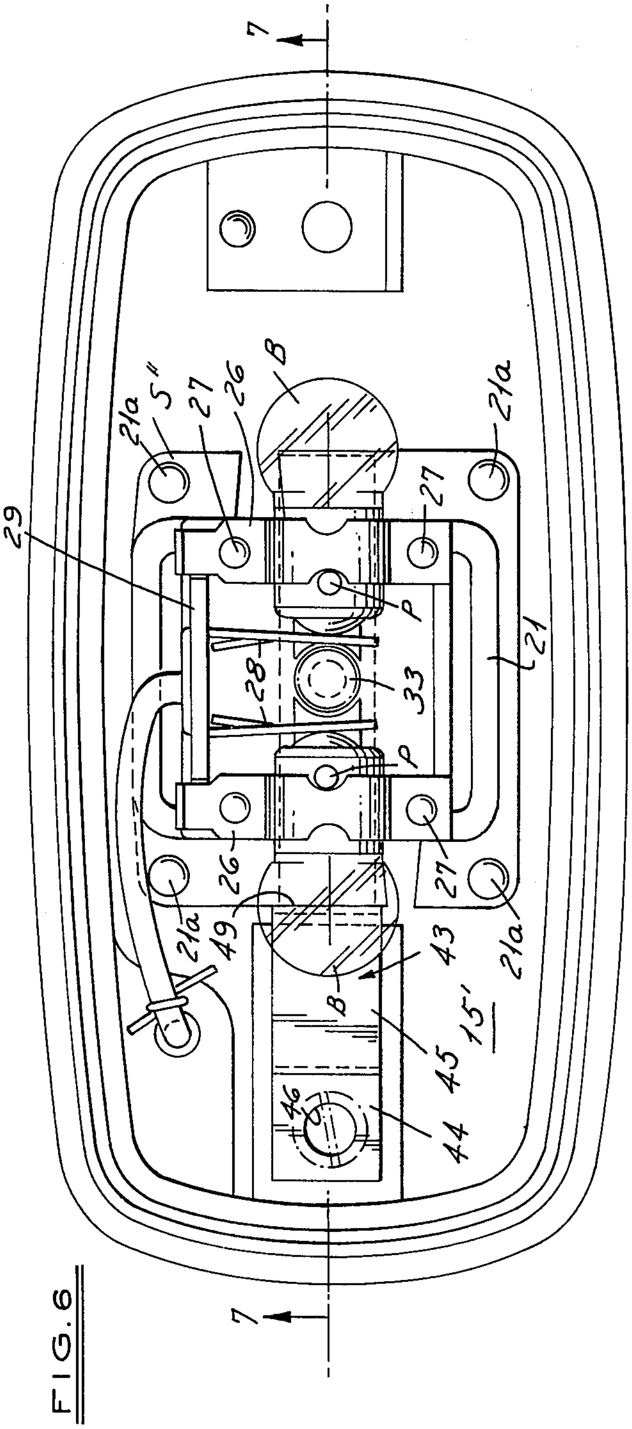
FIG. 6 is a plan view of another modified form of marker assembly.
Figure 7:
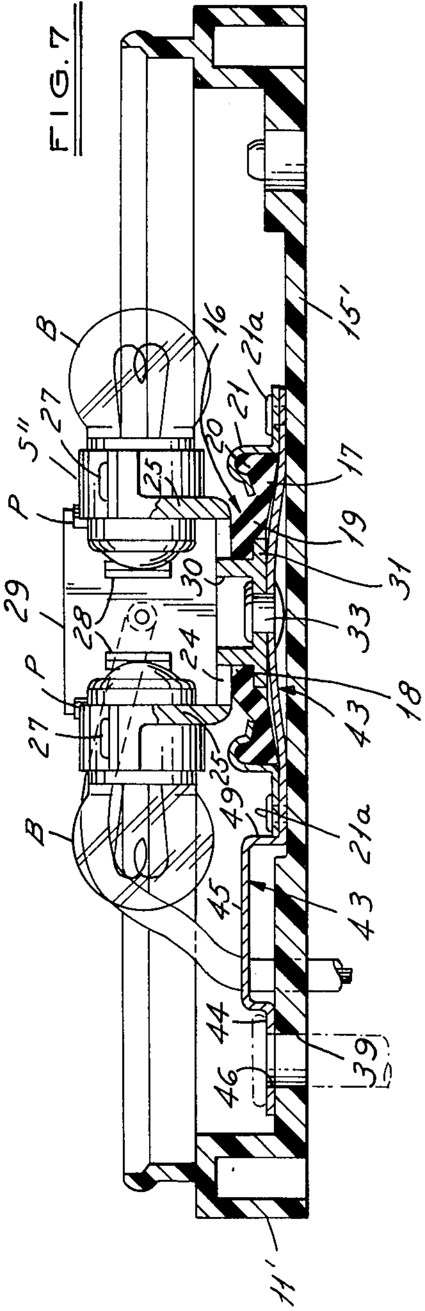
FIG. 7 is a sectional view taken along the line 7—7 in FIG. 6.

In the form shown in FIGS. 6 and 7, the housing is made of plastic and is identical to housing 11' shown in FIGS. 4 and 5. However, ground strap 43 comprises a flat end 44 connected to the remainder of strap 43 by an offset flat portion 45. As in the form of the invention shown in FIGS. 4 and 5, when the sub-assembly S'' is mounted on the bottom wall 15', the end 44 lies flat against the upper surface of bottom wall 15' and an opening 46 overlies opening 39 in the bottom wall 15'. In this form, the ground strap 43 is accurately located by right angle portion 49, which is bent within a close tolerance, and abuts one end of frame 21. Rivet 33 fastens ground strap 43 to sub-assembly S thereby preventing rotation of the ground strap 43 with respect to the frame 21.

We claim:

1. In a lamp assembly, the combination comprising
a housing assembly including a bottom wall,
a mounting member,
means for fastening said mounting member on said bottom wall,
said mounting member having a central resilient portion spaced from said base,
said central portion having a centrally located opening therein,
a socket base,
said base having a centrally located projection,
said projection extending through said opening,
a ground strap of electrically conductive material,
means for fastening said ground strap to said projection of said socket base,
said strap having portions thereof extending beneath said resilient mounting member and contacting the upper surface of said bottom wall of said housing.

2. The combination set forth in claim 1 wherein said housing is made of electrically conductive material such that an electrical circuit is provided between said strap and said housing.

3. The combination set forth in claim 1 wherein said housing is made of electrically non-conductive material, one end of said strap extending beyond said resilient mounting member and extending along said top surface of said bottom wall, said end of said strap and said bottom wall having aligned openings therein.

4. The combination set forth in claim 1 wherein said means for fastening said ground strap to said socket base comprises a rivet.

5. In a lamp assembly, the combination comprising
a housing assembly including a bottom wall,
a mounting member,
means for fixing said mounting member on said base comprising a frame overlying said member,
said mounting member having a central resilient portion spaced from said base,
said central portion having a centrally located opening therein,
a socket base,
said base having a planar surface and a centrally located projection,
said projection extending through said opening,
a ground strap of electrically conductive material,
means for fastening said ground strap to said projection of said socket base,
said strap having portions thereof extending beneath said resilient mounting member and contacting the upper surface of said bottom wall of said housing.

6. The combination set forth in claim 5 wherein said housing is made of electrically conductive material such that an electrical circuit is provided between said strap and said housing.

7. The combination set forth in claim 5 wherein said housing is made of electrically non-conductive material, one end of said strap extending beyond said resilient mounting member and extending along said top surface of said bottom wall, said end of said strap and said bottom wall having aligned openings therein.

8. The combination set forth in claim 7 wherein said end of said strap is connected to the remainder of said strap by a portion bent out of the plane of the end, interengaging means between said frame and said last-mentioned portion for orienting said frame relative to said bottom wall.

9. The combination set forth in claim 8 wherein said bent portion is arcuate.

10. The combination set forth in claim 8 wherein said bent portion is flat.

11. The combination set forth in claim 5 wherein said strap is normally flat before it is fastened to said socket base.

12. The combination set forth in claim 5 wherein said means for fastening said group strap to said socket base comprises a rivet.

13. In a lamp assembly, the combination comprising
a housing assembly including a bottom wall,
a mounting member,
frame means for fastening said mounting member on said bottom wall,
said mounting member having a central resilient portion spaced from said base,
said central portion having a centrally located opening therein,
a socket base,
said base having a centrally located projection,
said projection extending through said opening,
a ground strap of electrically conductive material,
means for fastening said ground strap to said projection of said socket base,
said strap having portions thereof extending beneath said resilient mounting member and contacting the upper surface of said bottom wall of said housing,
said strap including a portion engaging said frame means to orient said frame means relative to said bottom wall.

14. The combination set forth in claim 13 wherein said portion comprises a tab extending into a notch in said frame means.

15. The combination set forth in claim 13 wherein said portion is bent out of the plane of said strap.

16. The combination set forth in claim 15 wherein said bent portion is arcuate.

17. The combination set forth in claim 15 wherein said bent portion is flat.

18. In a lamp assembly, the combination comprising
a housing assembly including a bottom wall,
a mounting member,
means for fastening said mounting member on said bottom wall,
said mounting member having a central resilient portion spaced from said base,
said central portion having a centrally located opening therein,
a socket base,
said base having a centrally located projection,
said projection extending through said opening,
a ground strap of electrically conductive material,
means for fastening said ground strap to said projection of said socket base,
said strap having portions thereof extending beneath said resilient mounting member and contacting the upper surface of said bottom wall of said housing,
said housing being made of electrically non-conductive material,
one end of said strap extending beyond said resilient mounting member and extending along said top surface of said bottom wall,
said end of said strap and said bottom wall having aligned openings therein,
said end of said strap being connected to the remainder of said strap by a portion bent out of the plane of the end and engaging said means for mounting said resilient mounting member on said bottom wall.

19. The combination set forth in claim 18 wherein said bent portion is arcuate.

20. The combination set forth in claim 18 wherein said bent portion is flat.

21. In a lamp assembly, the combination comprising
a housing assembly including a bottom wall,
a mounting member,
means for fastening said mounting member on said bottom wall,
said mounting member having a central resilient portion spaced from said base,
said central portion having a centrally located opening therein,
a socket base,
said base having a centrally located projection,
said projection extending through said opening,
a ground strap of electrically conductive material,
means for fastening said ground strap to said projection of said socket base,
said strap having portions thereof extending beneath said resilient mounting member and contacting the upper surface of said bottom wall of said housing,
said strap being normally flat before it is fastened to said socket base.

* * * * *